(12) United States Patent
Canard et al.

(10) Patent No.: US 9,021,572 B2
(45) Date of Patent: Apr. 28, 2015

(54) ANONYMOUS ACCESS TO A SERVICE BY MEANS OF AGGREGATED CERTIFICATES

(75) Inventors: Sébastien Canard, Caen (FR); Roch Lescuyer, Chaville (FR)

(73) Assignee: Orange, Paris (FR)

( * ) Notice: Subject to any disclaimer, the term of this patent is extended or adjusted under 35 U.S.C. 154(b) by 63 days.

(21) Appl. No.: 13/996,936

(22) PCT Filed: Dec. 19, 2011

(86) PCT No.: PCT/FR2011/053050
§ 371 (c)(1),
(2), (4) Date: Jun. 21, 2013

(87) PCT Pub. No.: WO2012/085425
PCT Pub. Date: Jun. 28, 2012

(65) Prior Publication Data
US 2013/0276084 A1    Oct. 17, 2013

(30) Foreign Application Priority Data
Dec. 23, 2010    (FR) ..................................... 10 61146

(51) Int. Cl.
*H04L 9/32* (2006.01)
*H04L 9/00* (2006.01)
*H04L 29/06* (2006.01)

(52) U.S. Cl.
CPC .......... *H04L 63/0823* (2013.01); *H04L 9/3263* (2013.01); *H04L 2209/42* (2013.01); *H04L 9/3218* (2013.01)

(58) Field of Classification Search
CPC . H04L 63/0807; H04L 63/0823; H04L 63/08; H04L 63/123; H04L 9/3013; H04L 9/3263; H04L 9/3294; H04L 9/3218; H04L 2209/42; G06Q 20/383

USPC ......... 713/150–153, 155–158, 170, 168, 173, 713/175; 380/28, 46; 705/74; 726/7, 10
See application file for complete search history.

(56) References Cited

U.S. PATENT DOCUMENTS

| | | | | |
|---|---|---|---|---|
| 5,604,805 | A | * | 2/1997 | Brands ............................ 380/30 |
| 5,606,617 | A | * | 2/1997 | Brands ............................ 380/30 |

(Continued)

OTHER PUBLICATIONS

Bhargav-Spantzel et al., "Multifactor Identity Verification Using Aggregated Proof of Knowledge," IEEE Transactions on Systems, Man, and Cybernetics—Part C: Applications and Reviews, IEEE Service Center, Piscataway, NJ, US, vol. 40(4), pp. 372-383 (Jul. 1, 2010).

(Continued)

*Primary Examiner* — Hosuk Song
(74) *Attorney, Agent, or Firm* — Drinker Biddle & Reath LLP

(57) ABSTRACT

A method of anonymous access to a service, comprising the allocation, by at least one certifying entity, of a plurality of certificates to a user entity, the certificates being calculated on the basis of at least one attribute associated with the user entity, the calculation, by the user entity, of an aggregated certificate on the basis of a plurality of certificates among the certificates allocated to the user entity, the calculation, by the user entity, of a proof of knowledge of the aggregated certificate and a verification, performed by a verifying entity, of at least one of these certificates by means of said proof of knowledge, the access to the service being provided by the verifying entity to the user entity as a function of the result of this verification.

16 Claims, 6 Drawing Sheets

(56) References Cited

U.S. PATENT DOCUMENTS

| | | | |
|---|---|---|---|
| 7,245,718 B2* | 7/2007 | Sundaram et al. | 380/30 |
| 7,266,692 B2* | 9/2007 | Ramzan et al. | 713/168 |
| 7,490,070 B2* | 2/2009 | Brickell | 705/75 |

OTHER PUBLICATIONS

Brands, "A Technical Overview of Digital Credentials," retrieved from internet website: http://www.credentica.com/overview.pdf, pp. 1-40 (Feb. 20, 2002).

Camenisch et al., "Efficient Group Signature Schemes for Large Groups," Advances in Cryptology—Crypto '97. Santa Barbara, Aug. 17-21, 1997, Proceedings of the Annual International Cryptology Conference (Crypto), Berlin, Springer, DE, vol. CONF. 17, pp. 410-424 (Aug. 17, 1997).

Paci et al., "VeryIDX—A Digital Identity Management System for Pervasive Computing Environments," Software Technologies for Embedded and Ubiquitous Systems, Lecture Notes in Computer Science, Springer Berlin Heidelberg, Berlin, Heidelberg, pp. 268-279 (Oct. 1, 2008).

\* cited by examiner

ANONYMOUS ACCESS TO A SERVICE BY MEANS OF AGGREGATED CERTIFICATES

CROSS-REFERENCE TO RELATED APPLICATIONS

This application is the U.S. national phase of the International Patent Application No. PCT/FR2011/053050 filed Dec. 19, 2011, which claims the benefit of French Application No. 1061146 filed Dec. 23, 2010, the entire content of which is incorporated herein by reference.

FIELD

The invention relates to the field of systems of anonymous accreditation for anonymous access to services, in particular by means of allocation of aggregated certificates.

BACKGROUND

In a conventional accreditation system, a trusted organization issues certified accreditations for certain users, concerning one or more attributes of the user.

Such an organization may be, for example, city offices issuing certified accreditations in the form of identity cards which present certain attributes associated with the user such as the last name, first name, date of birth, address, etc. This organization can also be a university issuing certified accreditations in the form of student cards which present certain attributes associated with a student such as the last name, first name, student id number, fields of study, etc.

When wanting to access a service offered by a third party acting as a service provider, the user may then wish to use such certified accreditations anonymously, meaning while minimizing the information he provides to the service provider to obtain the desired service.

For example, access to certain specific services may be limited to city residents. In such cases, the user must then prove in a city-certified manner that he is indeed a resident of the city, but he may not want to reveal other attributes on his identity card, such as his name or exact address.

Similarly, a student may want to receive a discount on a service offered by the third party. The student must then prove that he possesses an accreditation issued by a university, but may not want to reveal other attributes concerning him on his student id card, such as his name or the courses he is taking.

To address this need for anonymity, it is possible to set up accreditation systems that use cryptographic techniques similar to group signatures or blind signatures.

For group signatures, during the accreditation creation phase the certifying organization signs the set of attributes associated with the user, producing only one signature. This signature must be such that the certifying organization cannot use this accreditation to pass itself off as the user, which is possible for example with techniques tied to group signature schemes. The trusted entity is the organization which issues the accreditations. In the examples presented above, the trusted entity is the city or the university.

Once the user possesses such an accreditation, he can reveal one or more of the attributers associated with him, depending on what is needed by the third party acting as service provider from which he is requesting a service, by generating, similarly to group signature techniques, proof on knowledge of unrevealed attributes and a signature for all attributes, whether revealed or not, without disclosing either the unrevealed attributes or the signature of the certifying organization. The user thus preserves his anonymity with the outside world.

In this case, it is necessary to use a signature scheme which allows signing multiple messages/attributes with a single signature and in which the person possessing the signature is able to prove that he knows the signature and the signed messages, without revealing either the signature or the set of these messages/attributes he wants to hide, while retaining the ability to provide in unencrypted form the attribute or attributes requested of him by the third party.

Such a signature scheme consumes computation time because it requires explicitly hiding non-revealed attributes. The size of the proof therefore depends on the number of attributes initially certified by the issuing entity. Also, its implementation requires using cryptographic data of significant size, such as the Idemix technology proposed by IBM.

In the case of blind signatures, the concept consists of having the certifying organization blindly sign the attributes. The use of such blind signatures makes the accreditation system more effective, at the cost, however, of increased user traceability. An example of this type of technique is applied in the UProve technology proposed by Microsoft.

The present invention has the object of overcoming the above disadvantages of prior art solutions, and proposing an alternative technique for anonymous accreditation which is potentially more efficient and less demanding of computation time and bandwidth, and which simplifies the procedures when a user needs to rely upon accreditations originating from different organizations.

SUMMARY

The invention therefore proposes a method of anonymous access to a service, comprising:

the allocation, by at least one certifying entity, of a plurality of certificates to a user entity, these certificates being calculated on the basis of at least one attribute associated with the user entity;

the calculation, by the user entity, of an aggregated certificate on the basis of certificates among the certificates allocated to the user entity;

the calculation, by the user entity, of a proof of knowledge of the aggregate certificate; and a verification, performed by a verifying entity, of at least one of these certificates by means of said proof of knowledge, the access to the service being provided by the verifying entity to the user entity as a function of the result of said verification.

In one embodiment, the allocation of the plurality of certificates to the user entity comprises, for each of the certificates allocated by a certifying entity: the calculation of a certificate by means of public data linked to a secret key of the user entity, at least one attribute associated with the user entity, and a secret key of the certifying entity; and the transmission of the certificate to the user entity, which allows certifying that the user does indeed have the attribute in question while not revealing the user's secret key.

In particular, the certificate can be calculated in the context of bilinear environments with pairings, according to the following formula:

$$\sigma_i = \left( C \cdot \prod_{k=1}^{l_j} H\left(g_1^{sk_{Cj}} \| g_2^{sk_{Cj}} \| m_k \right) \right)^{sk_{Cj}}$$

where $\sigma_i$ represents the certificate, C represents the public data linked to the secret key of the user entity, $l_j$ represents the number of attributes signed by the certifying entity $C_j$, H represents a cryptographic hash function, $g_1$ and $g_2$ represent two group generators chosen randomly and uniformly from two respective bilinear groups of order p, where p is a prime number, $sk_{Cj}$ represents the secret key of the certifying entity, and $m_k$ represents an attribute associated with the user entity.

In an advantageous embodiment in which the certificate calculated by the certifying entity is a temporary certificate, the public data linked to the secret key of the user entity is a commitment to the secret key of the user entity calculated in the user entity by means of a random variable before being sent to the certifying entity, and the temporary certificate received by the user entity is unmasked by means of said random variable in order to obtain the certificate allocated to the user entity. This prevents the certifying entity from generating certificates that it could use in the user's place.

In particular, the unmasking of the temporary certificate includes calculating the certificate allocated to the user entity by multiplying the certificate received from the certifying entity by the variable $(g_1^{sk_{Cj}})^{-s}$, where $g_1$ represents a group generator chosen randomly and uniformly from a group of order p, where p is a prime number, $sk_{Cj}$ represents the secret key of the certifying entity, and s is a value randomly chosen from the set $Z_p$ of integers modulo p.

Advantageously, the certificate allocated to the user entity is verified by the user entity after the temporary certificate is unmasked, in order to be able to interrupt the allocation protocol before sending any proof of knowledge if this protocol does not complete properly.

Advantageously, the public data linked to the secret key of the user entity is verified by means of a proof of knowledge of this public data, and the calculation of the certificate only occurs if the result of the commitment verification is positive, which avoids needlessly performing calculations for the certificate if the user is not authorized to obtain such a certificate, and allows sending an error message if the protocol does not complete properly.

In particular, the allocation step can comprise the calculation, by the user entity, of the public data linked to the secret key of the user entity, the calculation of a first part of the proof of knowledge from this public data linked to the secret key, and the calculation of a second part of the proof of knowledge from random data received from the certifying entity.

In one particular embodiment, the commitment calculation includes calculating a first part of said public data linked to the secret key of the user entity and calculating a second part of the public data linked to the secret key of the user entity and to at least one certificate allocated by another certifying entity.

Advantageously, the calculation of the proof of knowledge of the plurality of certificates allocated to the user entity includes calculating a commitment to the aggregated certificate, calculating a first part of the proof of knowledge on the basis of the commitment to the aggregated certificate, and calculating a second part of the proof of knowledge on the basis of random data received from the verifying entity, which allows not directly revealing the aggregated certificate and therefore better ensures anonymity.

The invention also relates to a computer program comprising instructions for carrying out the step of calculating a certificate as above when this computer program is executed by a calculation unit located in a certifying entity.

The invention also relates to a computer program comprising instructions for carrying out the step of generating a proof of knowledge of a plurality of certificates allocated to a user entity as above when this computer program is executed by a calculation unit located in a user entity.

The invention additionally relates to a computer program comprising instructions for carrying out the step of verification by means of a proof of knowledge of a plurality of certificates as above, when this computer program is executed by a calculation unit located in a verifying entity.

For the purposes of the desired protection, said computer programs are to be considered as computer program products.

Moreover, the invention proposes a certifying entity, able to accredit a user entity, comprising a calculation unit able to carry out the step of calculating a certificate on the basis of at least one attribute as above, and a communication unit able to send this calculated certificate to the user entity.

The invention also proposes a verifying entity, able to verify a user entity, comprising a communication unit able to receive a proof of knowledge of a plurality of certificates allocated to the user entity and a calculation unit able to carry out said verification step by means of this proof of knowledge, in order to initiate the providing of a service to the user entity as a function of the result of the verification.

The invention additionally proposes a user entity, able to request a service through a verifying entity by means of a proof of knowledge of a plurality of certificates allocated to the user entity by at least one certifying entity, this user entity comprising a communication unit able to receive a plurality of certificates originating from at least one certifying entity and a calculation unit able to carry out said step of calculating a proof of knowledge on the basis of the plurality of certificates received, the communication unit being additionally able to send the proof of knowledge to a verifying entity in order to request a service.

Lastly, the invention relates to a system of anonymous accreditation for anonymous access to a service, comprising at least one certifying entity as described above, a verifying entity as described above, and a user entity as described above.

BRIEF DESCRIPTION OF THE DRAWINGS

Other features and advantages of the invention will be apparent from reading the following detailed description, and from the attached drawings in which.

DETAILED DESCRIPTION

Figure 1:
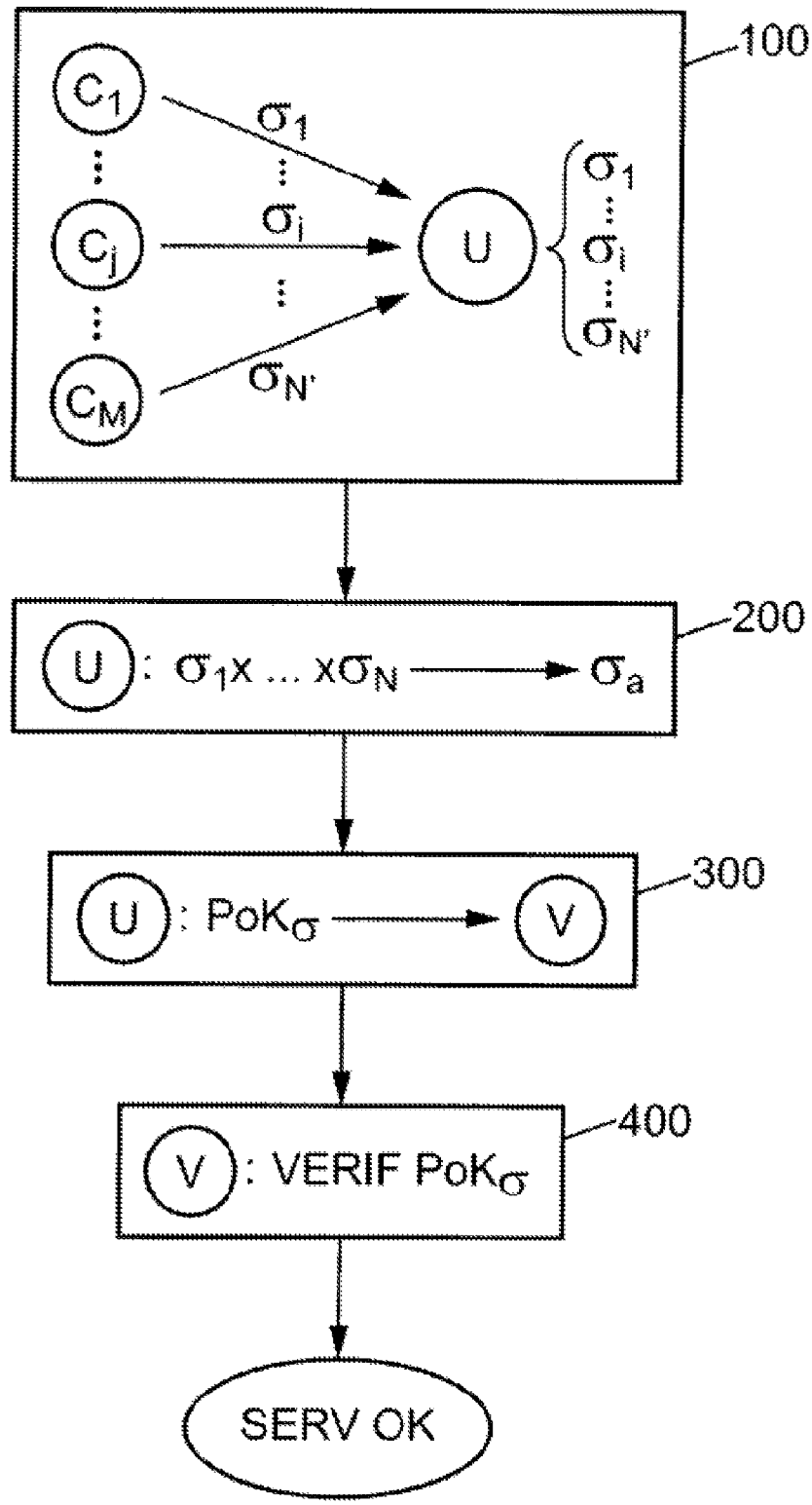
FIG. 1 illustrates the main steps of a method for anonymous access to a service according to the invention.

First we will refer to FIG. 1, which illustrates the main steps of a method of anonymous access to a service according to the invention.

This method of anonymous access begins with the prerequisite allocation (step 100) of a plurality of certificates $\sigma_1, \ldots, \sigma_i, \ldots, \sigma_{N'}$ to a user entity U. These certificates are allocated by at least one certifying entity $C_j$, or even by a plurality of certifying entities $C_1, \ldots, C_j, \ldots, C_M$, such that a same certifying entity $C_j$ can allocate multiple certificates to the user entity U.

"User entity" is understood to mean any device which can be utilized by a user and which has at least one communication unit for communicating with other entities, and at least one calculation unit for performing calculations on data exchanged with these other entities, as will be explained below.

Similarly, "certifying entity" is understood here to mean any device having at least one communication unit for communicating with other user entities, and at least one calculation unit for performing calculations on data exchanged with these user entities in order to allocate them a certificate, such a certificate being aggregatable with other certificates as will be explained below.

Lastly, "certificate" is understood here to mean one or more data items, in digital form, which allow the user entity and its user to be authenticated with a third party service provider (which may be distinct from the certifying entity) without revealing more information to it than what is required to validate access to this service and therefore maintaining their anonymity. The term anonymous accreditation can be used, in which case the certifying entity can be viewed as an accreditation entity.

In the present invention, a certificate $\sigma_i$ is generated by means of one or more attribute(s) $m_1, \ldots, m_k$ associated with the user entity U.

In particular, such attributes $m_1, \ldots, m_k$ may be certain attributes of the user who is utilizing this user entity U. Returning to the example of a certifying entity that is part of a university and a user entity that belongs to a student, such attributes can correspond to the student's last name, first name, student id number, the different types of courses he has taken at the university, etc. In the other illustrative example already mentioned in which the certifying entity belongs to the city offices which issue identification cards, these attributes may correspond to the last name of a city resident, his first name, date of birth, address, etc.

Because each of the certificates $\sigma_i$ is generated from such attributes, the user of the user entity can utilize such certificates $\sigma_i$ to be authenticated with a body requesting proof of certification of such attributes from a certifying entity, by means of his user entity U, without revealing any further information.

Once a certain number of certificates $\sigma_1, \ldots, \sigma_i, \ldots, \sigma_{N'}$ have been allocated to the user entity U, an aggregated certificate $\sigma_a$ is calculated (step 200) by the user entity U from a plurality of certificates $\sigma_1, \ldots, \sigma_i, \ldots, \sigma_N$ (where N≤N') among the certificates allocated to the user entity (U), for example by multiplying them together. This aggregation step 200 may, for example, be performed on the fly when the user initiates the procedure of requesting a service with a verifying entity V.

Thus, when the user entity U wants to be authenticated with a verifying entity V requesting authentication on the basis of a certain number of user attributes, the user entity U can choose the $\sigma_i$ corresponding to the attributes that are required for the authentication from among the N' certificates it has available to it.

The method of anonymous access continues with the user entity U calculating (step 300) a proof of knowledge $PoK_\sigma$ of the aggregated certificate $\sigma_a$.

"Proof of knowledge of certificates $\sigma_a$" is understood to mean data, in digital form, calculated from this aggregated certificate and which prove that the user has knowledge of this aggregated certificate and therefore of the individual certificates $\sigma_1, \ldots, \sigma_i, \ldots, \sigma_N$, it is composed of, and therefore that these certificates were indeed allocated to the user entity U by a certifying entity, without actually revealing these certificates.

Here, to the extent that each certificate $\sigma_i$ was itself obtained from attributes associated with the user entity, the proof of knowledge $PoK_\sigma$ generated in this manner indirectly corresponds to a proof of knowledge of the fact that the user of the user entity U does indeed have these attributes that are associated with him, which allows the third party to receive information regarding this subject without it having direct access to either the user identity or to the other previously certified attributes. The only certainty is that the attributes it obtains do actually belong to this user entity and they were actually certified by a certifying entity C.

This calculation of the proof of knowledge $PoK_\sigma$, carried out in the user entity U, ends with sending this proof of knowledge $PoK_\sigma$ to a verifying entity V in order to obtain a service.

Thus, "verifying entity" is understood here to mean any device having at least one communication entity for communicating with user entities requesting a service by means of a proof of knowledge of certificates, and at least one calculation unit for carrying out calculations on data exchanged with these user entities, in order to verify these data before initiating the providing of the service. The service can then be either provided directly by the verifying entity, or provided by a third party entity that is different from the verifying entity in which case the verifying entity is able to request that the third party entity provide the service after having verified the data.

After receipt of the proof of knowledge $PoK_\sigma$ by this verifying entity V, a verification (step 400) is then carried out by this verifying entity V by means of this proof of knowledge $PoK_\sigma$ concerning the certificates $\sigma_1, \ldots, \sigma_i, \ldots, \sigma_N$ previously allocated to the user entity U.

The verifying entity V then provides the user entity U with access to the requested service based on the result of this verification, meaning only if this verification yields a positive result.

In the invention, the certificates $\sigma_1, \ldots, \sigma_i, \ldots, \sigma_N$ are aggregatable, meaning an aggregated certificate $\sigma_a$ can be obtained in the user entity U from the aggregation of different certificates $\sigma_1, \ldots, \sigma_N$ allocated by one or more certifying entities $C_1, \ldots C_j, \ldots, C_M$, for example by multiplying these certificates.

In order to obtain such aggregatable certificates, an aggregatable signature scheme can be advantageously employed by the certifying entity $C_j$ in order to generate an aggregatable certificate $\sigma_i$, by signing one or more attribute(s) $m_1, \ldots, m_k$ with a secret key $sk_{Cj}$ allocated beforehand to the certifying entity $C_j$, and potentially certified in the context for example of a conventional PKI system.

The advantage of using aggregatable certificates $\sigma_1, \ldots, \sigma_N$ is that it allows obtaining a single aggregated certificate $\sigma_a$, created from multiple aggregatable certificates. This aggregated certificate $\sigma_a$ can then be verified by different verifying entities by means of a proof of knowledge $PoK_\sigma$ of such an aggregated certificate. In the invention, a new proof of knowledge $PoK_\sigma$ of the aggregated certificate $\sigma_a$ is separately generated for each access request from the user entity U to a verifying entity V in order to prevent user traceability.

The invention also offers a potential gain in bandwidth and in ease of use, to the extent that only a proof of knowledge concerning an aggregated certificate is sent to the verifying entities V instead of a multitude of separate certificates, and to the extent that access to a third party service does not require proof for which the amount of computation would depend on the number of attributes initially certified by the issuing entity.

In particular, in a small embedded device, the act of transmitting data consumes more power than a computation. For this reason, aggregation of certificates by the user entity U will drain the battery less than their transmission.

The invention also simplifies the procedures when a user needs to make use of accreditations originating from different organizations, because a single aggregated certificate is used.

Figure 2:
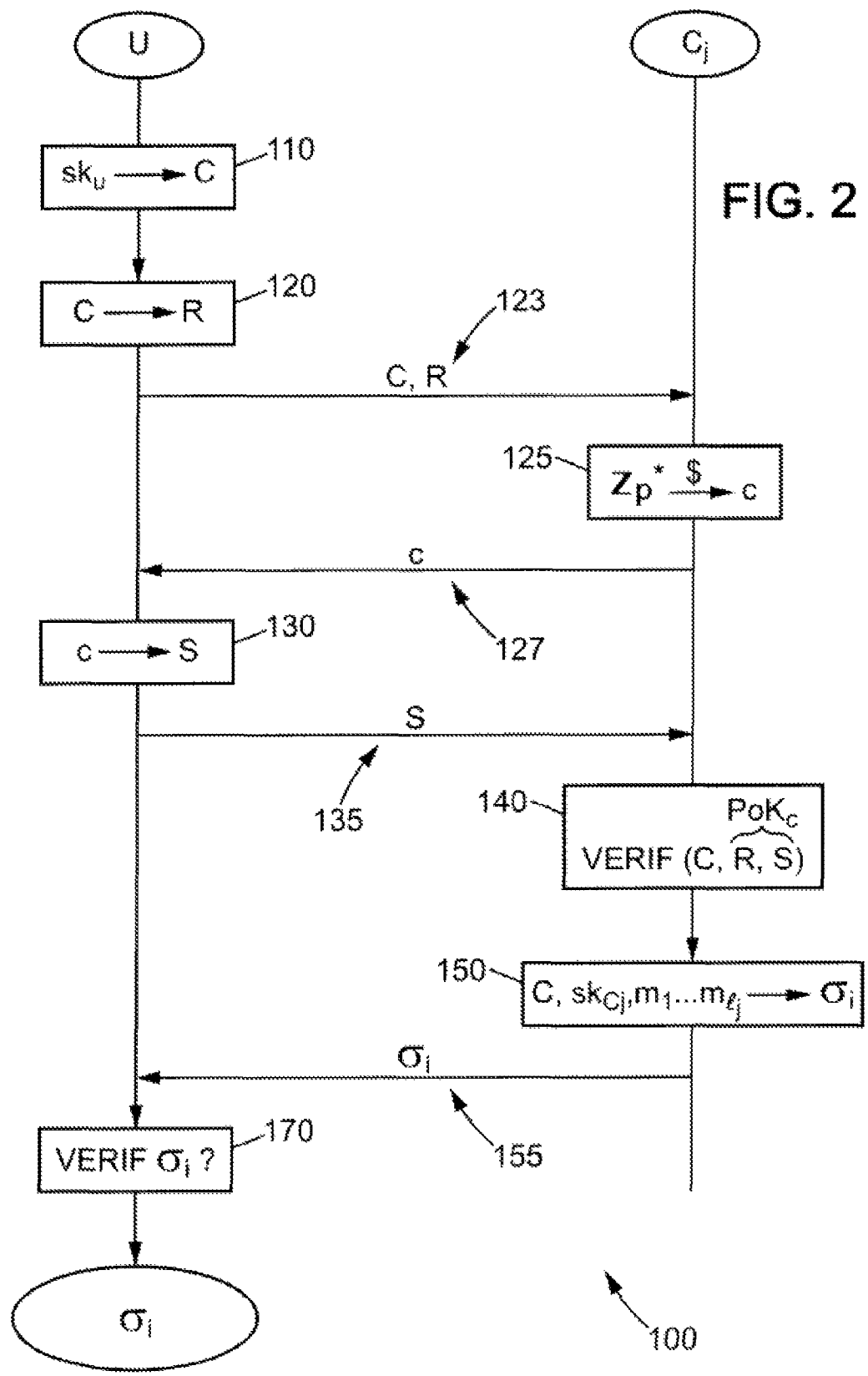
FIG. 2 illustrates the step of allocating a certificate used by the method of anonymous access to a service according to the invention.

Now we will refer to FIG. 2, which specifically illustrates the step 100 of allocating a certificate $\sigma_i$ as used by the method of anonymous access to a service according to the invention.

In this FIG. 2, the sub-steps carried out by the user entity U are represented on the left, the sub-steps carried out by the certifying entity are represented on the right $C_j$, and it also shows the various data exchanged between these entities by their respective communication units.

The user entity U and the certifying entity $C_j$ advantageously have a pair of private and public keys, respectively $(sk_U, pk_U)$ $(sk_{Cj}, pk_{Cj})$, for example pairs of asymmetric keys according to a public key encryption scheme. These private and public keys may be obtained as follows:

a) an initialization procedure SETUP is first executed, during which:
A bilinear environment $(p, G_1, G_2, e)$ is chosen where p is a prime number, $G_1$ and $G_2$ are two groups of order p, and e is a bilinear pairing applicable to $G_1 \times G_2$. Below, $Z_p$ indicates the set of integers modulo p;
a collision-resistant encryption hash function H: $\{0,1\}^* \rightarrow G_1$ is chosen;
two group generators $g_1$ and u are chosen randomly and uniformly in $G_1$; and
a group generator $g_2$ is chosen randomly and uniformly in $G_2$.

At the end of this initialization procedure, the global parameters $(p, G_1, G_2, e, g_1, g_2, u, H)$ are available.

b) a key generation procedure KEY.GEN is then executed, during which:
For the User Entity U:
a variable x is chosen randomly and uniformly in $Z_p$, which corresponds to the private key $sk_U$ of the user entity U, i.e. $sk_U = x$;
the variable $X = g_1^x$ is calculated, which corresponds to the public key $pk_U$ of the user entity U, i.e. $pk_U = X$.
For Each Certifying Entity $C_j$ Involved:
a variable $\gamma$ is chosen randomly and uniformly in $Z_p$, which corresponds to the private key $sk_{Cj}$ of the certifying entity U, i.e. $sk_{Cj} = \gamma$;

the variables $\Gamma_{j,1} = g_1^\gamma$ and $\Gamma_{j,2} = g_2^\gamma$ are calculated, in order to obtain the public key $pk_{Cj}$ of the certifying entity $C_j$, such that $pk_{Cj} = (\Gamma_{j,1}, \Gamma_{j,2})$.

Once these various prerequisite parameters are obtained, the allocation step 100 can begin with the calculation (step 110), by the user entity U, of public data C linked to the secret key $sk_U$ of the user entity U; this public data C allows hiding the secret key $sk_U$ while authorizing calculations involving this secret key.

As an example, in a first embodiment, this public data linked to the secret key $sk_U$ can be calculated according to the following formula:

$$C = u^{sk_U} \qquad (1)$$

Once the public data C is calculated, a first part R of a proof of knowledge $PoK_C$ of this public data C can be calculated by the user entity, during a step 120 of calculating at least a part of the proof of knowledge.

Similarly to the public data C, still in a first embodiment, this first part R of the proof of knowledge $PoK_C$ of the public data C can be calculated from data $r_x$, chosen randomly in $Z_p^*$, according to the following formula:

$$R = u^{r_x} \qquad (2)$$

The public data C and the first part R of the proof of knowledge $PoK_C$ of this public data C are then sent, in the form of digital data, to the certifying entity $C_j$ (step 123).

This certifying entity $C_j$ returns a random number c to the user entity U (step 127), in order to allow generating a second part S of the proof of knowledge $PoK_C$ by means of this random variable c, which is performed during step 130 of calculating a second part S of the proof of knowledge $PoK_C$ of the public data C by the user entity U.

In a first embodiment, this second part S of the proof of knowledge $PoK_C$ of the public data C can thus be calculated according to the following formula:

$$S = r_x + c \cdot sk_U \qquad (3)$$

This second part S of the proof of knowledge $PoK_C$ is then sent to the certifying entity $C_j$ (step 135).

Once in possession of the public data C and of the proof of knowledge $PoK_C$ of this public data C, the certifying entity $C_j$ can then calculate (step 150) a certificate $\sigma_i$, by means of: the public data C linked to the secret key $sk_U$ of the user entity U; one or more attribute(s) $m_1, \ldots, m_{l_j}$ associated with the user entity U; and the secret key $sk_{Cj}$ of the certifying entity $C_j$.

In other words, this calculation step 150 corresponds to the signing, by the certifying entity $C_j$, of one or more attribute(s) $m_1, \ldots, m_k, \ldots, m_l$ (where $l_j \geq 1$ is the number of attributes signed by the certifying entity $C_j$) associated with the user entity U by means of its secret key $sk_{Cj}$ by applying an aggregatable signature schema which allows obtaining an aggregatable signature corresponding to the certificate $\sigma_j$.

As an example, in the first embodiment introduced above, the certificate $\sigma_i$ can be calculated here according to the following formula:

$$\sigma_i = \left( C \cdot \prod_{k=1}^{l_j} H\left(g_1^{sk_{Cj}} \| g_2^{sk_{Cj}} \| m_k\right) \right)^{sk_{Cj}} = C^{sk_{Cj}} \cdot \prod_{k=1}^{l_j} \sigma'_k \qquad (4)$$

where $\sigma'_k = H\left(g_1^{sk_{Cj}} \| g_2^{sk_{Cj}} \| m_k\right)^{sk_{Cj}}$ Thus, in the special case where only one attribute $m_1$ is certified by the certifying entity $C_j$, meaning where $l_j=1$, this formula (4) then becomes the following formula:

$$\sigma_i = (C \cdot H(g_1^{skCj} \| g_2^{skCj} \| m_1))^{skCj} \quad (5)$$

It is advantageous to have this calculation be conditional to a step of successfully verifying the public data C, to avoid allocating a certificate to an unauthorized user.

To do this, once in possession of the public data C and of the proof of knowledge $PoK_C$ of this public data C, and before any certificate calculations, the certifying entity $C_j$ verifies (step 140) the public data C linked to the secret key $sk_U$ of the user entity U, by means of the proof of knowledge $PoK_C$, i.e. by means of the first and second parts R and S of the proof of knowledge $PoK_C$.

In the case of the first embodiment introduced above, this verification can consist of verifying that the following equality is satisfied:

$$u^{sx} = R \cdot C^c \quad (6)$$

If the result of this verification is positive, in other words if the equality (4) is satisfied, the certifying entity $C_j$ can then perform the calculations for the certificate $\sigma_i$ as described above. If this result is negative, an error data item (for example a "0") can be emitted and the method stops at this point.

Once calculated, the certificate $\sigma_i$ is then sent (step 155) to the user entity U where it can be directly used to obtain the aggregated certificate $\sigma_a$.

In one particular embodiment, one or more auxiliary information variable(s) $\sigma_k'$ such as $\sigma_k' = H(g_1^{skCj} \| g_2^{skCj} \sim m_k)^{skCj}$ may also be sent at this point to the user entity U, and this is done for each attribute $m_k$ belonging to a subset M' of attributes included in the set of all attributes $\{m_k\}_{1 \le k \le l}$ signed during calculation step 150. These auxiliary information variables $\sigma_k'$ can be used, during the step 300 of anonymous authentication with a verifying entity V, to hide certain attributes as explained below.

Once received by the user entity, it may be advantageous to verify (step 170) the certificate $\sigma_i$ in the user entity, before using it to generate any proof of knowledge.

This verification can be carried out by verifying a relation between the certificate $\sigma_i$, the attributes $m_1, \ldots, m_{l_j}$ used in generating this certificate $\sigma_i$, and the secret key $sk_U$ of the user entity U.

Returning to the first embodiment described above, this verification can consist of verifying the following equality:

$$e(\sigma_i, g_2) = e(u, \Gamma_{j,2})^{skU} \prod_{k=1}^{l_j} e(H(\Gamma_{j,1} \| \Gamma_{j,2} \| m_k), \Gamma_{j,2}) \quad (7)$$

If this relation (7) is not satisfied, the result of the verification 170 is negative, which is expressed by the sending of an error message (for example a "0") and the non-validation of the certificate $\sigma_i$ in the user entity U.

If this relation (7) is verified, the result of this verification is positive: the certificate $\sigma_i$ is validated and can be used later on to construct an aggregated certificate $\sigma_a$ which allows requesting a service involving attributes $m_1, \ldots, m_l$ at a verifying entity, possibly in combination with other attributes certified by other certifying entities.

This certificate $\sigma_j$ can be stored for this purpose in the user entity U, possibly together with the auxiliary information variables $\sigma_k'$ which were advantageously received from the certifying entity $C_j$.

This allocation step 100, which results in the allocation by a certifying entity $C_j$ of a certain number (at least one) of certificates $\sigma_j$ to the user entity U, can be repeated for each of M certifying entities within a set of certifying entities $\{C_j\}_{1 \le j \le M}$, which results in allocating to the user entity U a set of N certificates $\{\sigma_i\}_{1 \le i \le N}$ issued by these M certifying entities and concerning a set of attributes.

Figure 3:
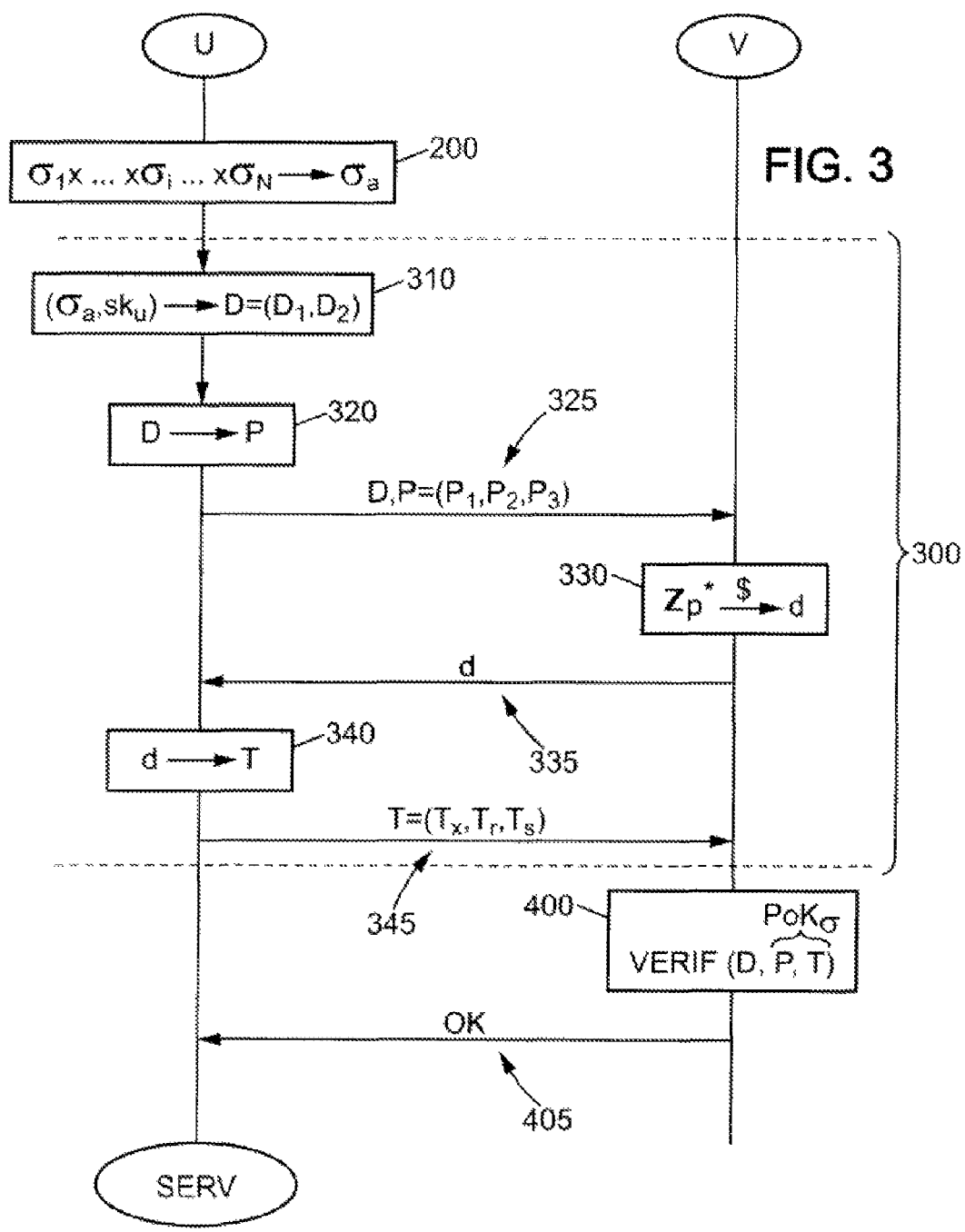
FIG. 3 illustrates the steps of calculating an aggregated certificate from certificates allocated to the user entity, calculating a proof of knowledge of these certificates, and verifying this proof of knowledge, as employed by the method of anonymous access to a service according to the invention.

We will now refer to FIG. 3, which illustrates the steps of calculating an aggregated certificate from certificates allocated to the user entity, calculating a proof of knowledge of these certificates, and verifying this proof of knowledge, as employed by the method of anonymous access to a service according to the present invention.

This FIG. 3 represents the sub-steps carried out by the user entity U on the left, the sub-steps carried out by the verifying entity V on the right, and also represents the various data exchanged between these entities via their respective communication units.

In the situation illustrated here, the user entity received, during the prerequisite allocation step 100, several certificates $\sigma_1, \ldots, \sigma_i, \ldots, \sigma_N$ respectively allocated by M certifying entities $C_1, \ldots, C_j, \ldots, C_M$.

Next, the calculation (step 200) of an aggregated certificate $\sigma_a$ is performed from a sub-set of previously obtained certificates $\sigma_1, \ldots, \sigma_i, \ldots, \sigma_k$, for example by multiplying these certificates such that $\sigma_a = \sigma_1 * \ldots * \sigma_i * \ldots * \sigma_N$.

This aggregation step 200 can be carried out on the fly by the user, when he wishes to request a service through a verifying entity V.

Once this aggregated certificate $\sigma_a$ is obtained, the user entity U calculates (step 300) a proof of knowledge $PoK_\sigma$ of the certificates allocated to the user entity, by means of this aggregated certificate $\sigma_a$.

The step 300 of calculating this proof of knowledge $PoK_\sigma$ can be subdivided as follows:

A commitment D to the aggregated certificate $\sigma_a$ is first calculated (sub-step 310) by means of this aggregated certificate $\sigma_a$ and the secret key $sk_U$ of the user entity U, for example according to the following procedure:

a) a random variable r is chosen in $Z_p^*$;
b) a first commitment part $D_1$ is calculated using this random variable r, such that $D_1 = g_1^r$
c) a second commitment part $D_2$ is calculated using the secret key $sk_U$ of the user entity U and the aggregated certificate $\sigma_a$, according to the formula $D_2 = \sigma_a^{1/skU} \cdot u^r$ The commitment D to the aggregated certificate $\sigma_a$ then corresponds to the pair (D1,D2).

Once this commitment D is calculated by the user entity U, the proof of knowledge $PoK_\sigma$ can be calculated based on at least this commitment D, in the following manner a) a first part P of this proof of knowledge $PoK_\sigma$ can be calculated by the user entity U, from at least a part of the commitment D, during a calculation step 320, according to the following procedure:

three random variables are chosen $r_x$, $r_r$ and $r_\delta$ in $Z_p^*$;
the two variables are calculated $P_1 = g_1^{r_r}$, $P_2 = D_1^{r_x} g_1^{-r_\delta}$
also calculated are $$P_3 = e(D_2, g_2)^{r_x} \cdot e(u, g_2)^{-r_\delta} \cdot e\left(u, \prod_{j=1}^{N} \Gamma_{j,2}\right)^{-r_x};$$

The first part P of the proof of knowledge $PoK_\sigma$ then corresponds to the triplet $(P_1, P_2, P_3)$.

b) The commitment D and the first part $P=(P_1,P_2,P_3)$ of the proof of knowledge $PoK_\sigma$ are then sent to the verifying entity V (step 325), which, after receiving these data, selects a random value d in $Z_p^*$ (step 330) and returns this random variable d to the user entity U (step 335).

c) Once this variable d is received, the user entity U then calculates a second part T of the proof of knowledge $PoK_\sigma$ (step 340) using this random variable d, for example according to the following procedure:

a variable $s_x$ is calculated such that $t_x=r_x+d\cdot sk_u$;
a variable $s_r$ is calculated such that $t_r=r_r+d\cdot r$; and
a variable $s_\delta$ is calculated such that $t_\delta=r_\delta+d\cdot r\cdot sk_u$.

The second part T of the proof of knowledge $PoK_\sigma$ then corresponds to the triplet of these variables, i.e. $T=(t_x,t_r,t_\delta)$.

At the end of this step 340, the second part T of the proof of knowledge $PoK_\sigma$ is sent (step 345) to the verifying entity V, which then has available the commitment D to the aggregated certificate $\sigma_a$, the random value d, and the two parts P and T of the proof of knowledge $PoK_\sigma$ of this aggregated certificate $\sigma_a$.

It is then possible to perform a verification 400 of this proof of knowledge $PoK_\sigma$ in the verification entity V.

Such a verification can be conducted by verifying whether the three following relations (8)-(10) are satisfied:

$$g_1^{t_r} = P_1 \cdot D_1^d \qquad (8)$$

$$D_1^{t_x} g_1^{-t_\delta} = P_2 \qquad (9)$$

$$e(D_2, g_2)^{t_x} e(h_1, g_2)^{-t_\delta} e\left(u, \prod_{j=1}^N \Gamma_{j,2}\right)^{-t_x} = \qquad (10)$$

$$P_3 \left( \prod_{j=1}^N e\left( \prod_{k=1}^{t_j} H(\Gamma_{j,1} \| \Gamma_{j,2} \| m_k), \Gamma_{j,2} \right) \right)^d$$

If any of these three relations (8) to (10) is not satisfied, the result of the verification 300 is negative, which is expressed by the issuing of an error message (for example a "0") and the non-allocation of the service requested by the user entity U at the verifying entity. The method of anonymous access to this service then stops at this point.

On the other hand, if all the relations (8) to (10) are satisfied, the result of the verification 300 is positive and the service requested by the user entity U at the verifying entity can be provided to this user entity U, for example by sending an authorization message (step 405) to the user entity U, this message possibly including data corresponding to the actual requested service.

In one particular embodiment where the user wishes to hide certain attributes $m_k$, allocated by the certifying entity $C_j$ and having an index k belonging to the set $M_j'$ included in $M_j=\{1,\ldots,l_j\}$, and for which he received auxiliary information variables $\sigma_k'$ such that $\sigma_k'=H(g_1^{sk_{C_j}}\|g_2^{sk_{C_j}}\|m_k)^{sk_{C_j}}$ during transmission step 155, the aggregated certificate $\sigma_a$ can be modified at the end of aggregation step 200 by using these auxiliary information variables $\sigma_k'$.

In particular, if the user wishes to hide the attributes $m_k$ for which the indices k belong to a sub-set $M_j''$ of the above set $M_j'$, the following operation is performed on the aggregated certificate after aggregation step 200, for the value(s) of k belonging to the set $M_j''$:

$$\sigma_a * \sigma_k'^{-1} \to \sigma_a$$

This transformation of the aggregated certificate $\sigma_a$, by means of one or more auxiliary variable(s) $\sigma_k'$ calculated for one or more attribute(s) $m_k$ to be hidden, allows hiding this or these attribute(s) $m_k$ from the verifying entity V during the process of authenticating the user entity U.

In this particular embodiment, the relation (10) to be verified then becomes the following modified relation (10'):

$$e(D_2, g_2)^{t_x} e(h_1, g_2)^{-t_\delta} e\left(u, \prod_{j=1}^N \Gamma_{j,2}\right)^{-t_x} = \qquad (10')$$

$$P_3 \left( \prod_{j=1}^N e\left( \prod_{k\in M_j/M_j''} H(\Gamma_{j,1} \| \Gamma_{j,2} \| m_k), \Gamma_{j,2} \right) \right)^d$$

In other words, this modified relation (10') boils down to verifying an accreditation aggregated over the sub-set $M_j/M_j''$ validated with the public keys $\Gamma_j$ of certifying entities.

Figure 4:
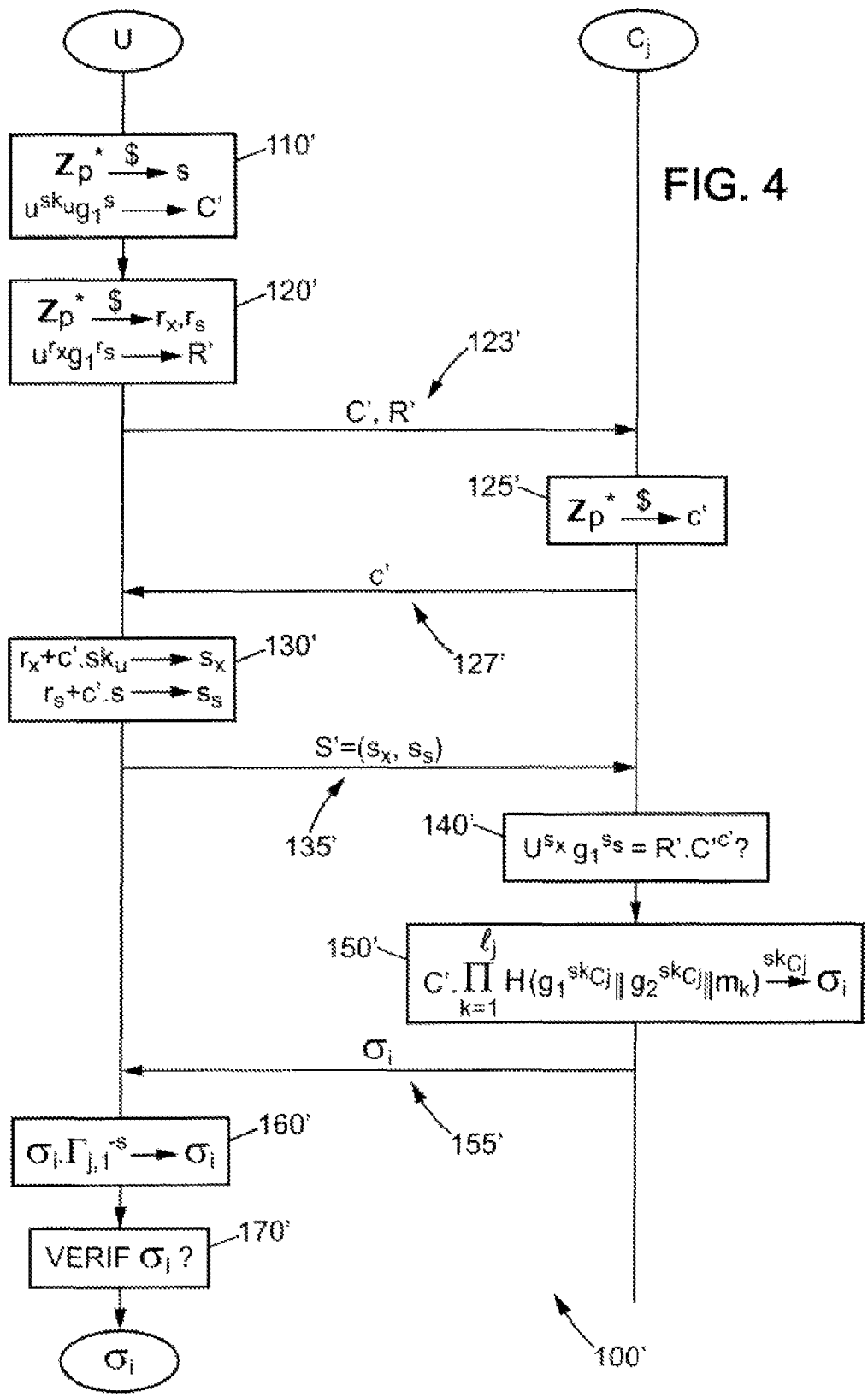
FIG. 4 more particularly illustrates the certificate allocation step employed by the method of anonymous access to a service according to a second embodiment of the invention.

We now refer to FIG. 4, which illustrates the step 100' of allocating a certificate used by the method of anonymous access to a service according to the second embodiment of the invention.

It is advantageous to hide the public data linked to the secret key $sk_U$ of the user entity U and the first part of proof of knowledge of this public data generated during the allocation step, in order to better protect the user by preventing the certifying entity $C_j$ from generating certificates that it could issue in place of the user.

To do this, in a second embodiment, the public data corresponds to a commitment to the secret key $sk_U$. The term "commitment" to a value is here used in its cryptographic sense and corresponds to data (in numerical form) that is non-modifiable and linked to this value, which allows keeping this value hidden initially but can be used later on to reveal this value. Such a commitment allows hiding the secret key $sk_U$, while guaranteeing its untraceability.

Thus, in the second embodiment illustrated in this FIG. 4, the allocation step 100' can begin with the calculation (step 110'), by the user entity U, of a commitment C' to the secret key $sk_U$ of the user entity U.

This calculation consists of choosing a random variable s in $Z_p^*$ and calculating the commitment C' according to the modified formula (11) below, which then replaces the formula (1) described above in relation to step 110 of the first embodiment:

$$C' = u^{sk_U} g_1^s \qquad (11)$$

Once this commitment C' is calculated, the first part R' of the proof of knowledge $PoK_{C'}$ of this commitment can be calculated by the user entity, during a calculation step 120', choosing two random variables $r_x$ and $r_s$ in $Z_p^*$ and calculating the value R' according to the following modified formula (12), which then replaces the formula (2) described above in relation to step 120 of the first embodiment:

$$R' = u^{r_x} g_1^{r_s} \qquad (12)$$

The commitment C' and the first part R' of the proof of knowledge $PoK_{C'}$ of this commitment C' are then sent to the certifying entity $C_j$ (step 123').

Upon receipt of these data, the certifying entity $C_j$ proceeds with selecting a random variable c' in $Z_p^*$ (step 125') and returns this random variable c' to the user entity U (step 127').

Once this variable c' is received, the user entity U then proceeds with calculating a second part S' of the proof of knowledge $PoK_{C'}$ of the commitment C' (step 130'), this second part S' corresponding to the pair of variables ($s_x$, $s_s$) calculated according to the following modified formulas (13) and (14), which thus replace the formula (3) described above in relation to step 130 of the first embodiment, according to the following procedure:

$$s_x = r_x + c' \cdot sk_u \quad (13)$$

$$s_s = r_s + c' \cdot s. \quad (14)$$

The second part S' of the proof of knowledge $PoK_{C'}$ such that $S' = (s_x, s_s)$ is then sent to the certifying entity $C_j$ (step 135').

Once in possession of the commitment C', of the first part R' of the proof of knowledge $PoK_{C'}$, and of the second part $S' = (s_x, s_s)$ of this proof of knowledge $PoK_{C'}$, the certifying entity $C_j$ can proceed with the verification (step 140') of the commitment C' by verifying if the following modified relation (15), corresponding to the relation (6) described relative to step 140 of the first embodiment, is satisfied:

$$u^{s_x} g_1^{s_s} = R' \cdot C'^{c'} \quad (15)$$

If this modified relation (5') is not satisfied, the result of the verification 140' is negative, which is expressed by the issuing of an error message and the non-allocation of a certificate to the user entity U. The step 100' of allocating the certificate then stops at this point.

If, however, the modified relation (15) is satisfied, the result of the verification 140' is positive and the allocation step 100' can continue with calculating (step 150') a certificate $\sigma_i$ according to the following formula (16), which corresponds to the formula (4) employed during the calculation step 150 of the first embodiment:

$$\sigma_i = \left( C' \cdot \prod_{k=1}^{l} H\left( g_1^{sk_{Cj}} \| g_2^{sk_{Cj}} \| m_k \right) \right)^{sk_{Cj}} \quad (16)$$

The certificate $\sigma_i$ so obtained corresponds to the certificate obtained by the formula (5) in the first embodiment multiplied by the variable $g_1^{s \cdot sk_{Cj}}$ and is therefore masked by such a variable. This certificate $\sigma_i$ is then not aggregatable as such and therefore cannot be used directly by the user entity U during the aggregation step 200. Here, this certificate $\sigma_i$ is a temporary certificate which is then sent (step 155') by the certifying entity $C_j$ to the user entity U.

In order to give this aggregatable character to the temporary certificate $\sigma_i$ received from the certifying entity $C_j$, this temporary certificate $\sigma_i$ is then unmasked (step 160') by the user entity U, according to the following formula (17):

$$\sigma_i \Gamma_{j,1}^{-s} = \sigma_i \cdot (g_1^{sk_{Cj}})^{-s} \rightarrow \sigma_i \quad (17)$$

This unmasking operation obtains a final certificate $\sigma_i$ which satisfies the relation of formula (4) (i.e. where $$\left( \text{i.e. where } \sigma_i = \left( C \cdot \prod_{k=1}^{l} H\left( g_1^{sk_{Cj}} \| g_2^{sk_{Cj}} \| m_k \right) \right)^{sk_{Cj}} \right)$$

and is therefore aggregatable with other aggregatable certificates.

This final certificate $\sigma_i$ is then advantageously verified (step 170') by means of the relation (7) described relative to step 170 of the first embodiment.

As with the first embodiment, this allocation step 100' according to a second embodiment, which results in the allocation by a certifying entity $C_j$ of a temporary certificate unmasked into a permanent certificate $\sigma_i$ by the user entity U, can be repeated for each of the M certifying entities $C_j$ of a set of certifying entities $\{C_j\}_{1 \leq j \leq M}$, which results in the allocation to the user entity U of a set of N certificates $\{\sigma_i\}_{1 \leq i \leq N}$, respectively issued by each of M certifying entities $C_1, \ldots, C_j, \ldots, C_M$.

Figure 5:
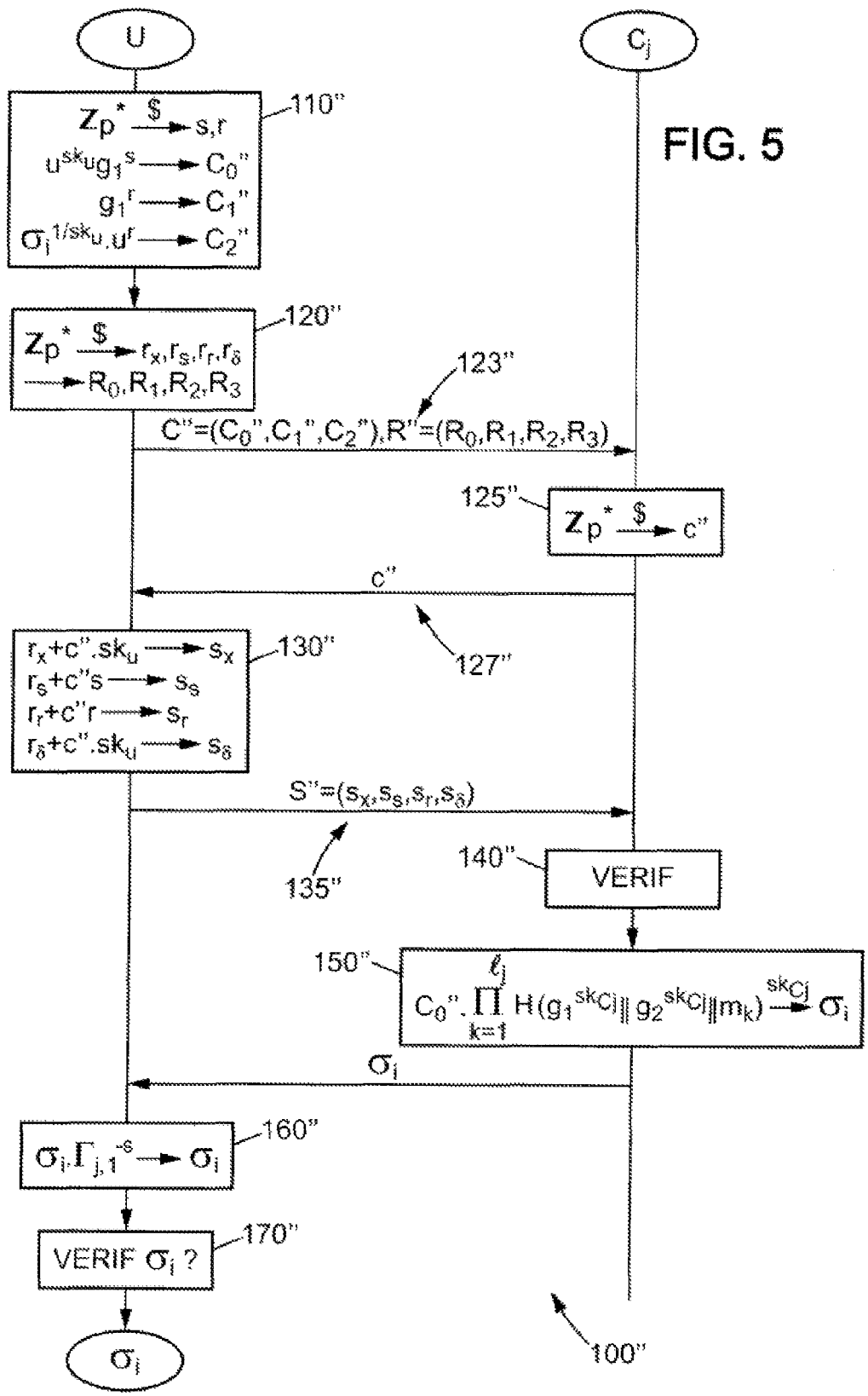
FIG. 5 more particularly illustrates the certificate allocation step employed by the method of anonymous access to a service according to a third embodiment of the invention.

In this second embodiment of the allocation step, the amount of data provided by the user of the user entity U to the verifying entity V, in the form of attributes associated with this user, is minimized We will now refer to FIG. 5, which also illustrates certificate allocation step 100", as employed by the method of anonymous access to a service, according to a third embodiment of the invention.

This third embodiment applies to the case where the user entity U already possesses N certificates $\sigma_1, \ldots, \sigma_N$ obtained from different certifying entities $C_1, \ldots, C_j, \ldots, C_M$ and requests the allocation of a new certificate $\sigma_{N+1}$ from a new certifying entity $C_{j+1}$ while attempting to minimize the data provided to this new certifying entity $C_{j+1}$.

To illustrate this third embodiment, let us consider the situation where the user entity has calculated an aggregated certificate $\sigma_a$ based on N already allocated certificates $\sigma_1, \ldots, \sigma_N$, meaning the case where:

$$\sigma_a = \prod_{i=1}^{N} \sigma_i$$

In this third embodiment as illustrated in FIG. 5, the allocation step 100" also begins with the user entity U calculating (step 110") public data C" linked to the secret key $sk_U$ of the user entity U.

This public data C" comprises a first public data part $C_0$" linked to the secret key $sk_U$, for example calculated according to the following procedure in which this first public data part corresponds to a commitment to this secret key $sk_U$, similarly to what was previously described for step 110':
  a) a random variable s is chosen in $Z_p^*$;
  b) $C_0" = u^{sk_u} g_1^s$ is calculated.

In addition to this first public data part $C_0$", a second public data part $C_1$" is calculated according to the following procedure:
  a) a random variable r is chosen in $Z_p^*$;
  b) $C_1" = g_1^r$ is calculated.

Lastly, a third public data part $C_2$" linked to the secret key $sk_U$ and to the aggregated certificate $\sigma_a$ is calculated from the secret key $sk_U$ of the user entity U and from the aggregated certificate $\sigma_a$, for example according to the following formula (18) where this third public data part $C_2$" corresponds to a commitment to the secret key $sk_U$ of the user entity U and the aggregated certificate $\sigma_a$:

$$C_2'' = \sigma_a^{\frac{1}{sk_U}} \cdot u^r \quad (18)$$

Thus the public data C" corresponds to the triplet of public data parts ($C_0$",$C_1$",$C_2$") and concerns the secret key $sk_U$ of the user entity U as well as the aggregated certificate $\sigma_a$ possessed by the user entity U.

Once this public data C" is calculated, the first part R" of the proof of knowledge $PoK_{C"}$ of this public data C" can be calculated by the user entity U, during a calculation step 120", according to the following procedure:

a) four random variables $r_x$, $r_s$, $r_r$ and $r_\delta$ are chosen in $Z_p^*$;
b) $R_0 = u^{r_x} g_1^{r_s}$, $R_1 = g_1^{r_r}$, $R_2 = (C_1'')^{r_x} g_1^{-r_\delta}$ is calculated;

c) $R_3 = e(C_2'', g_2)^{r_x} \cdot e(u, g_2)^{-r_\delta} \cdot e\left(u, \prod_{j=1}^{N} \Gamma_{j,2}\right)^{-r_x}$ is calculated.

The public data $C'' = (C_0'', C_1'', C_2'')$ and the first part $R' = (R_0, R_1, R_2, R_3)$ of the proof of knowledge $PoK_{C''}$ of this public data $C''$ are then sent to the certifying entity $C_{N+1}$ (step 123"), which, upon receipt of these data, proceeds with selecting a random variable $c''$ in $Z_p$ (step 125") and then returns this random variable $c''$ to the user entity U (step 127").

Once this variable $c''$ is received, the user entity U proceeds with calculating a second part $S''$ of the proof of knowledge $PoK_{C''}$ of this public data $C''$ (step 130") according to the following procedure:

a) a variable $s_x$ is calculated such that $s_x = r_x + c'' \cdot sk_u$;
b) a variable $s_s$ is calculated such that $s_s = r_s + c'' \cdot s$;
c) a variable $s_r$ is calculated such that $s_r = r_r + c'' \cdot r$; and
d) a variable $s_\delta$ is calculated such that $s_\delta = r_\delta + c'' \cdot r \cdot sk_u$.

The second part $S''$ of the proof of knowledge $PoK_{C''}$ then corresponds to the quadruplet of variables $(s_x, s_s, s_r, s_\delta)$, which is then sent to the certifying entity $C_j$ (step 135").

Once in possession of the public data $C''$, the first part $R''$ of the proof of knowledge $PoK_{C''}$, and the second part $S''$ of this proof of knowledge $PoK_{C''}$, the certifying entity $C_{j+1}$ then advantageously proceeds with the verification (step 140") of the public data $C''$, by verifying whether the four following relations (19)-(22) are indeed satisfied:

$$u^{s_x} g_1^{s_s} = R_0 \cdot (C_0'')^{c''} \tag{19}$$

$$g_1^{s_r} = R_1 \cdot (C_1'')^{c''} \tag{20}$$

$$(C_1'')^{s_x} g_1^{-s_\delta} = R_2 \tag{21}$$

$$e(C_2'', g_2)^{s_x} e(h_1, g_2)^{-s_\delta} e\left(u, \prod_{j=1}^{N} \Gamma_{j,2}\right)^{-s_x} = \tag{22}$$

$$R_3 \left(\prod_{j=1}^{N} e\left(\prod_{i=1}^{l_j} H(\Gamma_{j,1} \| \Gamma_{j,2} \| m_{j,i}), \Gamma_{j,2}\right)\right)^{c''}$$

If any of these relations (19) to (22) are not satisfied, the result of the verification 140" is negative, which is indicated by the issuing of an error message (for example a "0") and the non-allocation of a certificate $\sigma_{N+1}$ to the user entity U. The step 100" of allocating the certificate then stops at this point.

On the other hand, if all relations (19) to (22) are satisfied, the result of the verification 140" is positive and the allocation step 100" can continue by calculating (step 150") the certificate $\sigma_{N+1}$ according to the following formula (23):

$$\sigma_{N+1} = \left(C_0'' \cdot \prod_{k=1}^{l} H\left(g_1^{sk_{Cj}} \| g_2^{sk_{Cj}} \| m_k\right)\right)^{sk_{Cj}} \tag{23}$$

This certificate $\sigma_{N+1}$, which is a temporary certificate in the sense that it is not aggregatable as such, is then sent (step 155") by the certifying entity $C_{j+1}$ to the user entity U, where it can then be transformed into an unmasked certificate (i.e. aggregatable) $\sigma_{N+1}$ by the user entity U (step 160"), according to the following formula (24):

$$\sigma_{N+1} \cdot \Gamma_{j+1,1}^{-s} = \sigma_{N+1} \cdot (g_1^{sk_{Cj+1}})^{-s} \to \sigma_{N+1} \tag{24}$$

This new certificate $\sigma_{N+1}$ is then advantageously verified (step 170") by means of the following relation (25):

$$e(\sigma_{N+1}, g_2) = e(u, \Gamma_{j+1,2})^{sk_U} \prod_{k=1}^{l} e(H(\Gamma_{j+1,1} \| \Gamma_{j+1,2} \| m_l), \Gamma_{j+1,2}) \tag{25}$$

If this relation (25) is not satisfied, the result of the verification 170" is negative, which is indicated by the issuing of an error message (for example a "0") and the non-validation of the certificate $\sigma_{N+1}$ in the user entity U.

On the other hand, if the relation (25) is satisfied, the result of the verification 170" is positive and the certificate $\sigma_{N+1}$ is validated. It can then be stored by the user entity U in order to be used later on for anonymously requesting a service involving one of the attributes with a verifying entity V.

One will note here that, unlike the certificates $\sigma_i$ individually allocated in the first and second embodiments of the allocation step of the method, the certificate $\sigma_{N+1}$ obtained in the third embodiment is a certificate obtained upon presentation of a certain number of previously allocated certificates. It is thus possible to reproduce this allocation step 100" with a new certifying entity $C_{N+2}$, which will result in the allocation of a new certificate $\sigma_{N+2}$, and so on, in an iterative manner.

Figure 6:
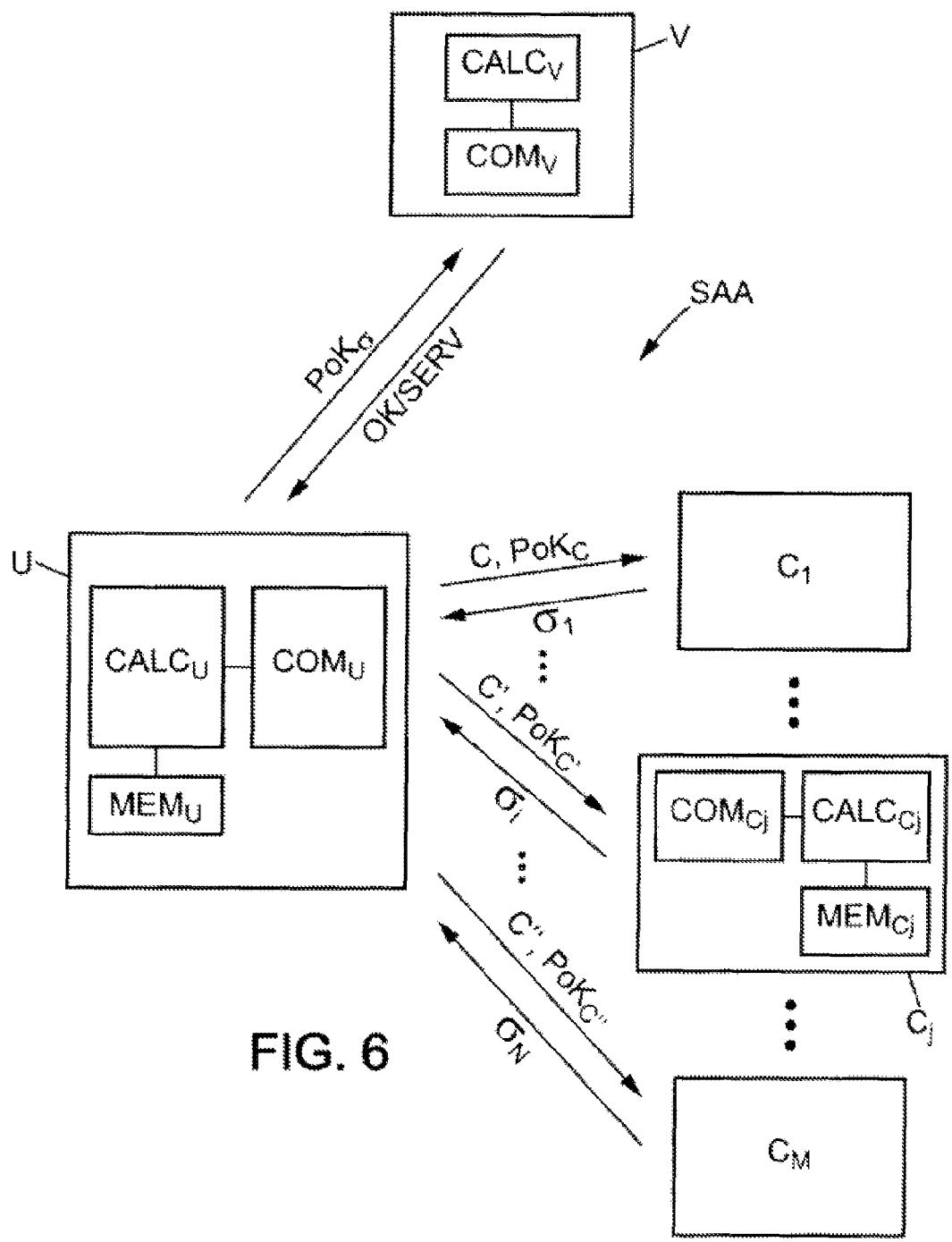
FIG. 6 schematically represents a system of anonymous accreditation for anonymous access to a service, in which the method of anonymous access to a service is carried out according to the invention.

Lastly we will refer to FIG. 6, which schematically represents a system of anonymous accreditation SAA for anonymous access to a service, in which the method of anonymous access of to a service as previously described is utilized.

This system of anonymous accreditation SAA comprises:

a user entity U, utilized by a user to request a service anonymously from a verifying entity by means of at least one or multiple anonymous certificate(s) $\sigma_j$ allocated by at least one certifying entity $C_j$;

at least one certifying entity $C_j$, able to accredit a user entity U anonymously by allocating one or more anonymous certificate(s) $\sigma_j$ to it; and at least one verifying entity V, able to verify the user entity U anonymously and to provide it with a service SERV after verification of a proof of knowledge $PoK_\sigma$ concerning one or more anonymous certificate(s).

FIG. 6 illustrates M distinct certifying entities $C_1, \ldots, C_j, \ldots, C_M$, where this number M can be any whole number greater than or equal to 1. Only the certifying entity $C_j$ is described in detail, the other certifying entities being similar to this entity $C_j$.

This certifying entity $C_j$ can be a server-type computer device belonging to a certifying organization such as a city, a university, a prefecture, etc.

This certifying entity $C_j$ comprises in particular a calculation unit $CALC_{Cj}$ arranged to carry out the step 100 of allocating a certificate $A_i$ to the user entity U as described above. Such a calculation unit $CALC_{Cj}$ can consist of a processor, a microprocessor, or a personal computer or server comprising such a processor.

This certifying entity $C_j$ additionally comprises a communication unit $COM_{Cj}$ adapted to transmit the temporary certificate $A_i$ generated by the calculation unit $CALC_{Cj}$ to the user entity U to which it is allocated. This communication unit $COM_{Cj}$ can be implemented with radiofrequency-type transmission devices, wireless or optical, or wired, capable of transmitting digital data corresponding to a temporary certificate $A_i$ to the user entity U, as well as of receiving digital data from the latter corresponding to a commitment C and a proof of knowledge $PoK_C$ of this commitment C.

This certifying entity $C_j$ can additionally comprise a storage unit $MEM_{Cj}$, connected to the calculation unit $CALC_{Cj}$ and capable of storing the attributes associated with the user of the user entity U in order to be able to provide them at a later time to the calculation unit $CALC_{Cj}$ when it is to generate a certificate $A_i$. This storage unit $MEM_{Cj}$ additionally comprises a secure portion capable of storing the secret key $sk_{Cj}$ allocated to the certifying entity $C_j$.

As for the verifying entity V, it can be a server-type computer device belonging to a third party able to provide a service, such as public transportation, an organization selling concert or museum tickets, issuing meal tickets for students, or providing access to library or pool facilities, or some other entity.

This verifying entity V comprises a communication unit $COM_V$ capable of receiving a proof of knowledge $PoK_\sigma$ of a plurality of certificates $\sigma_1, \ldots, \sigma_i, \ldots, \sigma_N$ allocated to the user entity. This communication unit $COM_V$ can be implemented similarly to the communication unit $COM_{Cj}$ described above.

This verifying entity V additionally comprises a calculation unit $CALC_V$ capable of applying the verification step 400 described above to a proof of knowledge $PoK_\sigma$ received from the user entity U and of initiating the providing of a service SERV to this user entity U as a function of the result of this verification. This calculation unit $CALC_V$ can be implemented similarly to the calculation unit $CALC_{Cj}$ described above.

In one embodiment, the verifying entity V corresponds to the entity providing a service, in which case the verifying entity V comprises a service providing unit, which can be the calculation unit $CALC_V$ itself when this involves calculating a discount based on the user's age, for example. In another embodiment, the verifying entity V is not itself the entity providing a service, but assumes the role intermediate verifier. In this case, the communication unit $COM_V$ is additionally able to communicate with the entity providing the service requested by the user entity U, in order to initiate the providing of the service after the calculation unit $CALC_V$ has verified the proof of knowledge $PoK_\sigma$ received from the user entity U.

As for the user entity U, it can be in the form of a computer device such as a personal computer or a smart phone, or even a smart card or an RFID label, and comprises a communication unit $COM_U$, similar to the units $COM_V$ and $COM_C$ described above, capable of receiving at least one certificate $A_i$ calculated by a certifying entity $C_j$ and of sending a proof of knowledge $PoK_\sigma$ constructed from the certificates $A_i$ received from different certifying entities to the verifying entity V in order to request a service SERV.

The user entity U additionally comprises a calculation unit $CALC_U$ capable of carrying out the step 300 of calculating the proof of knowledge $PoK_\sigma$ of a plurality of certificates $\sigma_1, \ldots, \sigma_i, \ldots, \sigma_N$ allocated to the user entity, as described above. Such a calculation unit $CALC_U$ can be implemented similarly to the calculation units $CALC_{Cj}$ and $CALC_V$ described above.

This user entity U may additionally comprise a storage unit $MEM_U$, connected to the calculation unit $CALC_U$ and capable of storing the different certificates $A_1, \ldots, A_i, \ldots, A_N$ received from the certifying entities, the certificates $\sigma_1, \ldots, \sigma_i, \ldots, \sigma_N$ advantageously obtained by respectively unmasking certificates $A_1, \ldots, A_i, \ldots, A_N$ when the latter are temporary certificates, as well as the aggregated certificate $\sigma_a$ obtained from these certificates. This storage unit $MEM_U$ additionally comprises a secure portion capable of storing the secret key $sk_U$ allocated to the user entity U.

The invention additionally relates to a computer program comprising instructions for carrying out the step of generating a certificate $A_i$ by means of at least one attribute $m_k$ as above, when this computer program is executed by the calculation unit $CALC_{Cj}$ located in the certifying entity $C_j$ described above.

The invention also relates to a computer program comprising instructions for carrying out the step 300 of generating a proof of knowledge $PoK_\sigma$ of a plurality of certificates allocated to a user entity U when this computer program is executed by the calculation unit $CALC_U$ located in the user entity U described above.

The invention additionally relates to a computer program comprising instructions for carrying out the step 400 of verifying, by means of such a proof of knowledge $PoK_\sigma$ at least one certificate allocated to a user entity U when this computer program is executed by the calculation unit $CALC_V$ located in the verifying entity V described above.

These programs can use any programming language, and can be in the form of source code, object code, or intermediate code between source code and object code, such as in a temporarily compiled form, or in any other desirable form.

The invention also relates to an information storage medium that is readable by a computer or data processor, and comprises the instructions of one of the programs mentioned above. Such an information storage medium can be any entity or device capable of storing the program. For example, the medium may consist of storage such as ROM, for example a CD-ROM or microelectronic circuit ROM, or a magnetic recording medium, for example a diskette or hard drive.

This information storage medium can also be a transmissible medium such as an electrical or optical signal, which can be routed via an electrical or optical cable, by radio, or by other means. The program of the invention can in particular be downloaded on a network such as the Internet. Alternatively, the information storage medium can be an integrated circuit in which the program is incorporated, said circuit being adapted to execute or to be used in the execution of the method in question.

The invention can have applications in all fields in which services are provided to users based on the providing of personal information concerning these users.

The invention is particularly advantageous when a third party only provides a service on the basis of combining a user's personal information certified by one or (advantageously) multiple distinct certifying organizations, which usually leads the user to reveal personal information that is itself unnecessary for obtaining this service but is provided in combination with the information in the certificates necessary for obtaining this service, to this third party.

As an example, a first certificate can be issued by a city records office on the basis of a user attribute proving that the user is a resident of a specific city, among other personal attributes. A second certificate can be issued by a university on the basis of an attribute of this user proving that he is indeed a student at this university, among other personal attributes such as his age.

With the present invention, the user can then aggregate these two certificates in order to request a reduction from a public transit service which only gives such reductions to residents of that city who are students. By using the method of anonymous access according to the invention, the user can then obtain this reduction specific to students residing in that city, without having to reveal other personal information.

Of course, the invention is not limited to the example embodiments described and represented above, from which other embodiments can be envisaged without exceeding the scope of the invention.

The invention can thus be applied to the case where only one attribute $m_1$ is certified, which corresponds to the case where a certifying entity issues certificates solely on this attribute $m_1$. A simple and effective scheme is thus obtained. In this case, the certifying entity signs the attribute $m_1$, which may be in the form of a document, which in this case can be any stream of bits, short or long.

The invention can also apply to the case where multiple attributes $m_1, \ldots, m_{l_j}$ are certified, with $l_j > 1$. In this case, a document m to be signed can be separated into multiple sub-documents $m_i, \ldots, m_{ij}$, which leaves the user free to hide certain sub-documents when showing his accreditations while preventing him from hiding other sub-documents.

A particular embodiment of the proof of knowledge has been described in the embodiment illustrated in FIG. 3 concerning the proof of knowledge $PoK_\sigma$ of the aggregated certificate $\sigma_a$ sent to the verifying entity V during the authenticating phase corresponding to steps 300 and 400.

It is obvious, however, that the invention is not limited to this one embodiment and that the proof of knowledge $PoK_\sigma$ of the aggregated certificate $\sigma_a$ sent to the verifying entity V can consist of another form of public data constructed from this aggregated certificate and allowing proving that the user entity U has knowledge of this aggregated certificate $\sigma_a$ and that the component certificates of this aggregated certificate have indeed been allocated to the user entity U by one or more certifying entity/entities, without revealing the certificates themselves nor the aggregated certificate to the verifying entity V.

The invention claimed is:

1. A method performed by a processor of anonymous access to a service, comprising:
    the allocation, by at least one certifying entity, of a plurality of certificates to a user entity, said certificates being calculated on the basis of at least one attribute associated with the user entity, the allocation of the plurality of certificates comprising, for each of the certificates allocated by the certifying entity:
        the calculation of a certificate by means of public data linked to a secret key of the user entity, at least one attribute associated with the user entity, and a secret key of the certifying entity; and
        the transmission of the certificate to the user entity;
    the calculation, by the user entity, of an aggregated certificate on the basis of a plurality of certificates among the certificates allocated to the user entity;
    the calculation, by the user entity, of a proof of knowledge of the aggregated certificate; and
    a verification, performed by a verifying entity, of at least one of said certificates by means of said proof of knowledge, the access to the service being provided by the verifying entity to the user entity as a function of the result of said verification.

2. The method of anonymous access to a service according to claim 1, wherein the certificate is calculated in the context of bilinear environments with pairings, according to the following formula:

$$\sigma_i = \left( C \cdot \prod_{k=1}^{l_j} H\left(g_1^{sk_{Cj}} \| g_2^{sk_{Cj}} \| m_k\right) \right)^{sk_{Cj}}$$

where $\sigma_i$ represents the certificate, C represents the public data C linked to the secret key of the user entity, $l_j$ represents the number of attributes signed by the certifying entity $C_j$, H represents a cryptographic hash function, $g_1$ and $g_2$ represent two group generators chosen randomly and uniformly from two respective groups of order p, where p is a prime number, $sk_{Cj}$ represents the secret key of the certifying entity, and $m_k$ represents an attribute associated with the user entity.

3. The method of anonymous access to a service according to claim 1, wherein the certificate calculated by the certifying entity is a temporary certificate, wherein in the allocation step:
    the public key linked to the secret key of the user entity is a commitment to the secret key of the user entity calculated in the user entity by means of a random variable before being sent to the certifying entity;
    the temporary certificate received by the user entity is unmasked by means of said random variable in order to obtain the certificate allocated to the user entity.

4. The method of anonymous access to a service according to claim 3, wherein the unmasking of the temporary certificate includes calculating the certificate allocated to the user entity by multiplying the certificate received from the certifying entity by the variable $(g_1^{sk_{Cj}})^{-s}$, where $g_1$ represents a group generator chosen randomly and uniformly from a group of order p, where p is a prime number, $sk_{Cj}$ represents the secret key of the certifying entity, and s is a value randomly chosen from the set $Z_p$ of integers modulo p.

5. The method of anonymous access to a service according to claim 3, wherein the certificate allocated to the user entity is verified by the user entity after the temporary certificate is unmasked.

6. The method of anonymous access to a service according to claim 1, wherein in the allocation step:
    the public data linked to the secret key of the user entity is verified by means of a proof of knowledge of said public data; and
    the calculation of the certificate only occurs if the result of the commitment verification is positive.

7. The method of anonymous access to a service according to claim 1, the allocation step comprising:
    the calculation, by the user entity, of the public data linked to the secret key of the user entity;
    the calculation of a first part of the proof of knowledge, from the public data linked to the secret key; and
    the calculation of a second part of the proof of knowledge, from random data received from the certifying entity.

8. The method of anonymous access to a service according to claim 7, wherein the calculation of the public data comprises:
    the calculation of a first part of said public data linked to the secret key of the user entity; and
    the calculation of a second part of the public data linked to the secret key of the user entity and to at least one certificate allocated by another certifying entity.

9. The method of anonymous access to a service according to claim 1, wherein the calculation of the proof of knowledge of the aggregated certificate comprises:
    the calculation of a commitment to the aggregated certificate;

the calculation of a first part of the proof of knowledge on the basis of the commitment to the aggregated certificate;

the calculation of a second part of the proof of knowledge on the basis of random data received from the verifying entity.

10. A non-transitory computer program product comprising instructions to be performed by a processor for respectively carrying out the step of calculating a certificate, the step of generating a proof of knowledge of a plurality of certificates allocated to a user entity, and the step of verification by means of said proof of knowledge of a plurality of certificates according to claim 1, when this computer program is executed by a calculation unit respectively located in a certifying entity, a user entity, and a verifying entity.

11. A certifying entity able to accredit a user entity, comprising:

a calculation unit able to carry out the step of calculating a certificate on the basis of at least one attribute of the method of anonymous access comprising:

the allocation, by at least one certifying entity, of a plurality of certificates to a user entity, said certificates being calculated on the basis of at least one attribute associated with the user entity, the allocation of the plurality of certificates comprising, for each of the certificates allocated by the certifying entity:

the calculation of a certificate by means of public data linked to a secret key of the user entity, at least one attribute associated with the user entity, and a secret key of the certifying entity; and the transmission of the certificate to the user entity;

the calculation, by the user entity, of an aggregated certificate on the basis of a plurality of certificates among the certificates allocated to the user entity;

the calculation, by the user entity, of a proof of knowledge of the aggregated certificate; and a verification, performed by a verifying entity, of at least one of said certificates by means of said proof of knowledge, the access to the service being provided by the verifying entity to the user entity as a function of the result of said verification; and a communication unit able to send said certificate to the user entity.

12. A verifying entity able to verify a user entity, comprising:

a communication unit able to receive a proof of knowledge of a plurality of certificates allocated to the user entity; and a calculation unit able to perform a method of anonymous access by means of proof of knowledge, in order to initiate providing of a service to a user entity as a function of the result of a verification, said method of anonymous access comprising:

the allocation, by at least one certifying entity, of a plurality of certificates to a user entity, said certificates being calculated on the basis of at least one attribute associated with the user entity, the allocation of the plurality of certificates comprising, for each of the certificates allocated by the certifying entity:

the calculation of a certificate by means of public data linked to a secret key of the user entity, at least one attribute associated with the user entity, and a secret key of the certifying entity; and the transmission of the certificate to the user entity;

the calculation, by the user entity, of an aggregated certificate on the basis of a plurality of certificates among the certificates allocated to the user entity;

the calculation, by the user entity, of a proof of knowledge of the aggregated certificate; and a verification, performed by a verifying entity, of at least one of said certificates by means of said proof of knowledge, the access to the service being provided by the verifying entity to the user entity as a function of the result of said verification.

13. A user entity able to request a service through a verifying entity by means of a proof of knowledge of a plurality of certificates allocated to the user entity by at least one certifying entity, the user entity comprising:

a communication unit able to receive a plurality of certificates originating from at least one certifying entity; and a calculation unit able to carry out a step of calculating a proof of knowledge of a method of anonymous access on the basis of a plurality of certificates received, said method of anonymous access comprising:

the allocation, by at least one certifying entity, of a plurality of certificates to a user entity, said certificates being calculated on the basis of at least one attribute associated with the user entity, the allocation of the plurality of certificates comprising, for each of the certificates allocated by the certifying entity:

the calculation of a certificate by means of public data linked to a secret key of the user entity, at least one attribute associated with the user entity, and a secret key of the certifying entity; and the transmission of the certificate to the user entity;

the calculation, by the user entity, of an aggregated certificate on the basis of a plurality of certificates among the certificates allocated to the user entity;

the calculation, by the user entity, of a proof of knowledge of the aggregated certificate; and a verification, performed by a verifying entity, of at least one of said certificates by means of said proof of knowledge, the access to the service being provided by the verifying entity to the user entity as a function of the result of said verification, the communication unit being additionally able to send the proof of knowledge to the verifying entity in order to request a service.

14. A system of anonymous accreditation for anonymous access to a service, the system comprising:

at least one certifying entity comprising:

a calculation unit able to carry out the step of calculating a certificate on the basis of at least one attribute of the method of anonymous access comprising:

the allocation, by at least one certifying entity, of a plurality of certificates to a user entity, said certificates being calculated on the basis of at least one attribute associated with the user entity, the allocation of the plurality of certificates comprising, for each of the certificates allocated by the certifying entity:

the calculation of a certificate by means of public data linked to a secret key of the user entity, at least one attribute associated with the user entity, and a secret key of the certifying entity; and the transmission of the certificate to the user entity;

the calculation, by the user entity, of an aggregated certificate on the basis of a plurality of certificates among the certificates allocated to the user entity;

the calculation, by the user entity, of a proof of knowledge of the aggregated certificate; and a verification, performed by a verifying entity, of at least one of said certificates by means of said proof of knowledge, the access to the service being provided by the verifying entity to the user entity as a function of the result of said verification; and
a communication unit able to send said certificate to the user entity.

15. A system of anonymous accreditation for anonymous access to a service, the system comprising:
   a verifying entity comprising:
      a communication unit able to receive a proof of knowledge of a plurality of certificates allocated to the user entity; and
      a calculation unit able to perform a method of anonymous access by means of proof of knowledge, in order to initiate providing of a service to a user entity as a function of the result of a verification, said method of anonymous access comprising:
         the allocation, by at least one certifying entity, of a plurality of certificates to a user entity, said certificates being calculated on the basis of at least one attribute associated with the user entity, the allocation of the plurality of certificates comprising, for each of the certificates allocated by the certifying entity:
            the calculation of a certificate by means of public data linked to a secret key of the user entity, at least one attribute associated with the user entity, and a secret key of the certifying entity; and
            the transmission of the certificate to the user entity;
               the calculation, by the user entity, of an aggregated certificate on the basis of a plurality of certificates among the certificates allocated to the user entity;
               the calculation, by the user entity, of a proof of knowledge of the aggregated certificate; and
         a verification, performed by a verifying entity, of at least one of said certificates by means of said proof of knowledge, the access to the service being provided by the verifying entity to the user entity as a function of the result of said verification.

16. A system of anonymous accreditation for anonymous access to a service, the system comprising:
   a user entity able to request a service through a verifying entity by means of a proof of knowledge of a plurality of certificates allocated to the user entity by at least one certifying entity, the user entity comprising:
      a communication unit able to receive a plurality of certificates originating from at least one certifying entity; and
      a calculation unit able to carry out the a step of calculating a proof of knowledge of the a method of anonymous access according to claim 1 on the basis of the a plurality of certificates received, said method of anonymous access comprising:
         the allocation, by at least one certifying entity, of a plurality of certificates to a user entity, said certificates being calculated on the basis of at least one attribute associated with the user entity, the allocation of the plurality of certificates comprising, for each of the certificates allocated by the certifying entity:
         the calculation of a certificate by means of public data linked to a secret key of the user entity, at least one attribute associated with the user entity, and a secret key of the certifying entity; and
         the transmission of the certificate to the user entity;
            the calculation, by the user entity, of an aggregated certificate on the basis of a plurality of certificates among the certificates allocated to the user entity;
            the calculation, by the user entity, of a proof of knowledge of the aggregated certificate; and
            a verification, performed by a verifying entity, of at least one of said certificates by means of said proof of knowledge, the access to the service being provided by the verifying entity to the user entity as a function of the result of said verification,
   the communication unit being additionally able to send the proof of knowledge to the verifying entity in order to request a service.

* * * * *